US007151626B2

(12) United States Patent
Carlson

(10) Patent No.: US 7,151,626 B2
(45) Date of Patent: Dec. 19, 2006

(54) REFLECTIVE ORGANIC LAYERS

(75) Inventor: Steven Allen Carlson, Cambridge, MA (US)

(73) Assignee: Optodot Corporation, Allston, MA (US)

( * ) Notice: Subject to any disclaimer, the term of this patent is extended or adjusted under 35 U.S.C. 154(b) by 0 days.

(21) Appl. No.: 10/743,583

(22) Filed: Dec. 22, 2003

(65) Prior Publication Data

US 2004/0130771 A1 Jul. 8, 2004

Related U.S. Application Data

(63) Continuation-in-part of application No. 10/024,060, filed on Dec. 18, 2001, now Pat. No. 6,724,512, which is a continuation-in-part of application No. 09/852,392, filed on May 9, 2001, now Pat. No. 6,583,916, which is a continuation-in-part of application No. 09/706,166, filed on Nov. 3, 2000, now Pat. No. 6,381,059.

(60) Provisional application No. 60/163,349, filed on Nov. 3, 1999.

(51) Int. Cl.
*G02F 1/03* (2006.01)

(52) U.S. Cl. .................................................... 359/244

(58) Field of Classification Search ................ 359/244, 359/241, 240, 321; 252/582, 583, 587, 589
See application file for complete search history.

(56) References Cited

U.S. PATENT DOCUMENTS

| | | | | |
|---|---|---|---|---|
| 3,484,467 | A | 12/1969 | Susi et al. | |
| 3,637,769 | A | 1/1972 | Susi | |
| 4,921,780 | A * | 5/1990 | Oguchi et al. | 430/270.19 |
| 5,482,822 | A * | 1/1996 | Mihara et al. | 430/270.14 |
| 5,925,453 | A | 7/1999 | Kase et al. | |
| 5,956,175 | A | 9/1999 | Hajnowski | |
| 6,461,793 | B1 * | 10/2002 | Chang et al. | 430/271.1 |
| 6,475,590 | B1 * | 11/2002 | Kitayama et al. | 428/64.8 |

* cited by examiner

*Primary Examiner*—Hung Xuan Dang
*Assistant Examiner*—Tuyen Tra
(74) *Attorney, Agent, or Firm*—Steven A. Carlson

(57) ABSTRACT

The present invention pertains to organic reflective layers comprising an organic radical cation compound, wherein the layer reflects in the infrared region. Preferably, the organic radical cation compound is a salt of an aminium radical cation. Also provided are marking systems comprising such reflective layers and methods of marking an article utilizing such reflective layers.

49 Claims, 5 Drawing Sheets

REFLECTIVE ORGANIC LAYERS

RELATED APPLICATIONS

This application is a continuation-in-part of U.S. patent application Ser. No. 10/024,060, filed Dec. 18, 2001, now U.S. Pat. No. 6,724,512 which is a continuation-in-part of U.S. patent application Ser. No. 09/852,392, filed May 9, 2001, now U.S. Pat. No. 6,583,916, which is a continuation-in-part of U.S. patent application Ser. No. 09/706,166, filed Nov. 3, 2000, now U.S. Pat. No. 6,381,059, which claims priority to U.S. Provisional Patent Application Ser. No. 60/163,349, filed Nov. 3, 1999, and which relates to U.S. patent application Ser. No. 09/705,118, filed Nov. 2, 2000, now U.S. Pat. No. 6,589,451, all to the common assignee, the disclosures of which related applications are fully incorporated herein in their entirety for all purposes.

FIELD OF THE INVENTION

The present invention relates generally to the field of reflective layers, and particularly, pertains to organic layers that are reflective in the infrared and/or visible wavelength regions. More specifically, this invention pertains to reflective layers comprising a reflective organic free radical compound. This invention also pertains to marking systems comprising the reflective layers of this invention and to methods of marking an article by utilizing the reflective layers of the present invention.

BACKGROUND OF THE INVENTION

Throughout this application, various publications, patents, and published patent applications are referred to by an identifying citation. The disclosures of the publications, patents, and published patent specifications referenced in this application are hereby incorporated by reference into the present disclosure to more fully describe the state of the art to which this invention pertains.

Marking systems where an image of some type is applied on a substrate, such as on a flat piece of paper or plastic or on a 3-dimensional object, are designed to be read by humans and/or by machine scanners and cameras. The optical contrast between the image and non-image areas on the substrate is important for readability, particularly for the readability of encoded information, such as bar codes, by machine readers. Some machine reading is done at visible wavelengths, such as at the typical laser and light-emitting diode (LED) wavelengths of approximately 630, 650, and 680 nm. Other machine reading is done at infrared wavelengths, such as the scanning of ID cards at approximately 900 nm. For machine reading, a uniform reflective background is desirable to provide the required optical contrast to read the image that has a greater absorption and lower reflectance at the wavelength of the machine reader.

For some marking systems, such as security marking of ID cards and of goods for anti-counterfeiting purposes and such as the marking of postal flat pieces for sorting, it would be advantageous to have a visibly transparent layer that is applied to the substrate and provides a uniform reflective background, while still permitting the substrate and any images on the substrate to be seen visually, while being as aesthetically unobtrusive as possible, and while being opaque to the wavelength of the machine reader. This combination of properties in a passive optical layer that does not require any activation or stimulation to provide the needed properties would be especially desirable. A dynamic optical layer that temporarily and reversibly switches from a visibly transparent layer to provide a uniform reflective background with opacity to the machine reader adds complexity and cost to the marking system. An example of a marking system with a dynamic optical layer that reversibly switches to provide a reflective layer is described in U.S. Patent Application Publication No. US 2002/0152928, titled "Contrast Enhancing Marking System for Application of Unobstrusive Identification and Other Markings", published Oct. 24, 2002, to Lawandy et al.

Thin metallic layers or, alternatively, multiple interference layers where the index of refraction of alternating layers is varied are typically used in applications requiring passive reflective layers. Thin metallic layers often have a relatively flat absorption and reflectance across the visible and infrared regions so that it is difficult to achieve the desired combination of transparency, reflectance, and opacity for visual viewing and for machine reading at visible or infrared wavelengths. Multiple interference layers are complex and costly to manufacture, often requiring 6 or more layers, less than a 1% thickness variation in each layer, and extremely tight control over coating defects. Also, multiple interference layers that are visually transparent as desired in visible marking systems and solar window films often do not have a combination of strong absorption and reflectance in the near-infrared region of 700 nm to 1000 nm that would be useful for some types of marking systems and of solar window films.

It would be advantageous for marking systems and other applications, such as solar window films, optical mirrors, and optical splitters, to have a passive reflective layer comprising a material that is intrinsically reflective and has strongly varying absorption and reflectance properties across the visible and infrared regions that can be matched to the combination of absorption and reflectance properties desired in the particular application, such as matched to the human and machine readers for marking systems.

SUMMARY OF THE INVENTION

This invention pertains to reflective layers and to marking systems and other products such as solar window films comprising reflective layers. Preferably the reflective layers comprise an organic free radical compound that is reflective at a range of wavelengths in the visible and/or the infrared.

One aspect of this invention pertains to a reflective layer comprising a reflective organic radical cation compound, wherein the layer reflects in the infrared region from 1250 nm to 1700 nm. In one embodiment, the layer reflects in the infrared region from 700 nm to 1700 nm. In a preferred embodiment, the reflective organic free radical compound is a salt of an aminium radical cation. In a more preferred embodiment, the reflective organic free radical compound is selected from the group consisting of salts of a tetrakis (phenyl)-1,4-benzenediamine radical cation and salts of a tris(phenyl) aminium radical cation. In one embodiment, the thickness of the reflective layer is 0.1 to 0.3 microns. In one embodiment, the thickness of the reflective layer is 0.2 to 8 microns. In one embodiment, the thickness of the reflective layer is 0.4 to 1 micron.

Another aspect of the present invention pertains to a marking system comprising a reflective layer that is applied over a substrate, wherein the reflective layer comprises a reflective organic free radical compound. In one embodiment, the reflective layer is visibly transparent. In one embodiment, the reflective layer is opaque to optically reading the substrate at one or more visible and/or infrared wavelengths. In one embodiment, the reflective layer is reflective at the one or more visible and/or infrared wavelengths. In one embodiment, the infrared wavelengths are in the infrared region of 700 to 2000 nm. In one embodiment, the infrared wavelengths are in the infrared region of 2000 nm to 3000 nm. In one embodiment, the infrared wavelengths are in the infrared region at wavelengths greater than 3000 nm. In one embodiment, the reflective layer has greater than 10% reflectance at the one or more visible and/or infrared wavelengths. In a preferred embodiment, the reflective layer has greater than 20% reflectance at the one or more visible and/or infrared wavelengths. In a more preferred embodiment, the reflective layer has greater than 30% reflectance at the one or more visible and/or infrared wavelengths.

In one embodiment of the marking system of the present invention, an image layer is applied in an imagewise pattern over the reflective layer comprising an organic free radical compound, wherein the image layer comprises optically readable information. In one embodiment, the imagewise pattern comprises a bar code. In one embodiment, the reflective layer in areas where there is no overlying imagewise pattern of the image layer is reflective at one or more visible and/or infrared wavelengths, and wherein the imagewise pattern of the image layer is optically readable at the one or more visible and/or infrared wavelengths. In one embodiment, the image layer comprises a photochromic material. In one embodiment, the imagewise pattern of the image layer is in a state of high transparency at one or more visible and/or infrared wavelengths in a non-activated state, and reversibly shifts to a state of low transparency at the one or more visible and/or infrared wavelengths in an activated state by the photon-induced reaction of the photochromic material. In a preferred embodiment, the non-activated state is not optically readable and the activated state is optically readable at the one or more visible and/or infrared wavelengths. In one embodiment, the photochromic material comprises an organic free radical compound in one or both of the non-activated and activated states.

Another aspect of the present invention pertains to a card stock for a marking system, which card stock comprises a substrate and one or more reflective layers over at least a portion of the substrate, wherein at least one of the one or more reflective layers comprises a reflective organic free radical compound. In one embodiment, the at least a portion of the substrate is visibly transparent. In one embodiment, at least one of the one or more reflective layers is opaque to optically reading the substrate at one or more infrared wavelengths. In one embodiment, an image layer applied in an imagewise pattern overlying at least one of the one or more reflective layers, such image layer comprising optically readable information, is optically readable at the one or more infrared wavelengths when scanned from the side of the card stock on which the image layer was applied and is not optically readable at the one or more infrared wavelengths when scanned from the side of the card stock opposite from which the image layer was applied.

Another aspect of this invention pertains to a method of marking an article, wherein the method comprises the steps of (i) providing a substrate; and (ii) applying a reflective layer over the substrate, wherein the reflective layer comprises a reflective organic free radical compound. In one embodiment, the reflective layer is visibly transparent. In one embodiment, the reflective layer is opaque to optically reading the substrate at one or more visible and/or infrared wavelengths. In one embodiment, the method comprises a step (iii) of applying an image layer in an imagewise pattern over the reflective layer, wherein the image layer comprises optically readable information. In one embodiment, the imagewise pattern of the image layer comprises a bar code. In one embodiment, the image layer comprises a photochromic material.

As will be appreciated by one of skill in the art, features of one aspect or embodiment of the invention are also applicable to other aspects or embodiments of the invention.

BRIEF DESCRIPTION OF THE DRAWINGS

For the purpose of illustrating the invention, particular arrangements and methodologies are shown in the drawings. It should be understood, however, that the invention is not limited to the precise arrangements shown or to the methodologies of the detailed description.

DETAILED DESCRIPTION OF THE INVENTION

Organic Free Radical Compounds

Figure 1:
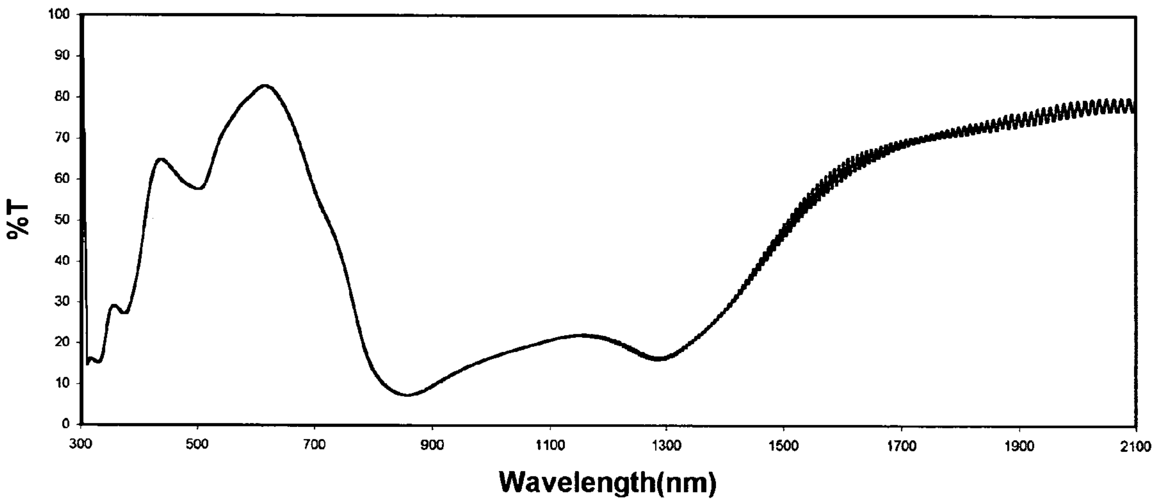
FIG. 1 shows the transmission spectrum from 300 to 2100 nm of a layer comprising an organic free radical compound on a polyester film substrate.

The term "organic free radical compound," as used herein, pertains to an organic compound which comprises at least one free unpaired electron on an atom, such as, for example, a carbon atom, a nitrogen atom, or an oxygen atom, in the ground state of the organic compound. Suitable organic free radical compounds for the reflective layers, marking systems, and other product applications of the present invention include neutral organic free radicals, salts of organic free radical cations, and salts of organic free radical anions. For purposes of brevity, the terms "organic free radical cation," "organic radical cation," and "radical cation" are used interchangeably herein. The word "cation," as used herein, pertains to a positively charged atom in a molecule, such as, for example, a positively charged nitrogen atom. Similarly, the terms "organic free radical anion," "organic radical anion," and "radical anion" are used interchangeably herein. The word "anion," as used herein, pertains to a negatively charged atom in a molecule, such as, for example, a negatively charged oxygen atom. It should be noted that the free unpaired electron and the positive and negative charges of the organic free radical compounds may be localized on a single atom or shared among more than one atom.

Examples of suitable salts of organic free radical cations for the reflective layers, marking systems, and other product applications of this invention include, but are not limited to, salts of aminium radical cations, such as, for example, tris(p-dibutylaminophenyl) aminium hexafluoroantimonate, which is commercially available as IR-99, a tradename for a dye available from GPT Glendale, Attleboro Falls, Mass. An equivalent chemical name for IR-99, used interchangeably herein, is the hexafluoroantimonate salt of N,N-dibutyl-N',N'-bis[4-(dibutylamino)phenyl]-1,4-benzenediamine radical cation. IR-99 is known to be a stable material that may exist in a layer of material, such as in a polymeric coating, under normal room conditions for an extended period of time. Other suitable salts of aminium radical cations with a tris(p-dibutylaminophenyl) aminium salt related molecular structure include IR-126 and IR-165, which are tradenames for dyes available from GPT Glendale, Attleboro Falls, Mass. These two dyes are likewise known to be stable in the dry powder form and in a layer of material, such as in a polymer-containing coating, under ambient room conditions for extended periods of time, such as for many years.

IR-126, which is the hexafluoroantimonate salt of tetrakis [4-(dibutylamino)phenyl]-1,4-benzenediamine radical cation, is particularly preferred for use in reversible photochromic imaging layers in the marking systems of this invention because of its very intense and relatively flat absorption across the 700 to 1700 nm wavelength region and because of its one-electron reduction to a very transparent neutral non-free radical compound which has no significant absorption above 500 nm. Also, IR-126 may undergo a one-electron oxidation to IR-165, which has a much lower absorption in the 1500 to 1700 nm wavelength region, but has a higher absorption in the 800 to 1200 nm wavelength region.

A pure dye layer of IR-165 on a smooth poly(ethylene terephthalate) (PET) plastic film was found to be reflective in the infrared wavelength region. IR-99 was found to have reflectance across the 1250 to 1700 nm wavelength region even though the IR-99 layer showed no significant absorption at wavelengths of 1250 nm and higher. Thus, certain organic free radical compounds, such as IR-99 and IR-165 aminium salts, show reflectance in the visible and/or infrared wavelength regions. Due to their reversible one-electron and two-electron reactions to form non-reflective products, these aminium salts are suitable for use in the reversible non-reflective-to-reflective switching of optical shutters and optical switch devices. Preferred are organic free radical compounds, such as IR-99, which are reflective and transmissive but not absorptive in the wavelength region of interest for the particular application, such as, for example, 1250 to 1700 nm for optical Internet applications.

Reflective Layers and Marking Systems

The terms "near-infrared wavelength region," "near-infrared wavelength," and "near-infrared," as used interchangeably herein, pertain to wavelengths from 700 nm to 2000 nm. The terms "visible wavelength region," "visible wavelength," and "visible," as used interchangeably herein, pertain to wavelengths from 400 to 700 nm.

A wide variety of organic free radical compounds, such as various neutral free radicals, salts of radical cations, and salts of radical anions, may be utilized in the reflective layers, marking systems, and other product applications of the present invention. Particular advantages for the use of organic free radical compounds in this invention include, but are not limited to, their extremely intense near-infrared absorptions and/or reflectivities at the desired wavelengths for reflective layers, marking systems, solar window films, mirrors, and optical Internet and other product applications; their large absorption and/or reflectivity variations over a broad range of wavelengths; their extremely transparent and non-reflective states in the near-infrared when switched by the transfer of one or more electrons by the absorption of photons, by applying an electric current, and thermally; their unique ultra-high speed photon conversions at as fast as sub-picosecond times; their stability to degradation by heat, light, or ambient conditions of moisture and air; their ease of fabrication by, for example, coating or plastic molding; and their non-toxicity.

In one embodiment, the organic free radical compound is a salt of a radical cation, preferably of an aminium radical cation, and most preferably, the radical cation is tris(p-dibutylaminophenyl) aminium hexafluoroantimonate (TAH). In a preferred embodiment, the free radical compound is a salt of a tetrakis(phenyl)-1,4-benzenediamine radical cation, such as, for example, the hexafluoroantimonate salt of tetrakis[4-(dibutylamino)phenyl]-1,4-benzenediamine diradical dication, which is available as IR-165 from GPT Glendale, Attleboro Falls, Mass. Besides n-butyl groups, other suitable alkyl groups include any of the alkyl groups, such as, for example, methyl, ethyl, 2-propyl, n-pentyl, and n-hexyl, and combinations thereof.

Their extremely intense absorptions and/or reflectivities are particularly beneficial in reducing the amount of material that is needed to produce the desired reflective layer. For example, to produce the desired reversible change in an optical shutter, the optical shutter may be made on a very miniature scale, such as less than 8 microns for the thickness of the layer which causes the reflectivity and/or absorption change. In one embodiment, the thickness of the reflective surface layer of this invention is 0.1 to 100 microns. In one embodiment, the thickness of the reflective surface layer is 0.2 to 8 microns. In one embodiment, the thickness of the reflective surface layer is 0.4 to 1 micron.

IR-165 has reflectance in the infrared region, including in the 1400 to 1700 nm range of wavelengths. In the case where the surface layers in the reflective state comprise an organic free radical compound having reflectance, such as, for example, IR-99 or IR-165, the surface layer may be comprised of a single reflective layer or of multiple reflective layers with non-reflective layers interposed between the reflective layers to make a reflective stack with individual reflective layers. Even when a reflective stack with multiple reflective layers, such as, for example, 10 individual reflective layers, is present, the overall thickness of the reflective layers may be 4 microns or less, since the individual reflective layers of the organic free radical compounds may have a thickness in the range, for example, of only about 0.1 to 0.3 microns and the non-reflective layers between the reflective layers may also have a thickness in the range, for example, of only about 0.1 to 0.3 microns.

Suitable salts of organic radical cations for the reflective layers, marking systems, and other product applications of this invention include, but are not limited to, salts of an aminium radical cation. The choice of the counteranion for the salt depends on a variety of factors such as, for example, the ease and cost of applying the reflective layer and the required stability of any reflective layers where the reflective organic radical cation salt is utilized, against degradation by oxygen, moisture, and photon exposures.

Chart 1 shows the chemical structure of IR-99, a representative free radical compound for the reflective layers of this invention. IR-99 is an example of a salt of a tris(4-dialkylaminophenyl) aminium radical cation.

Chart 1

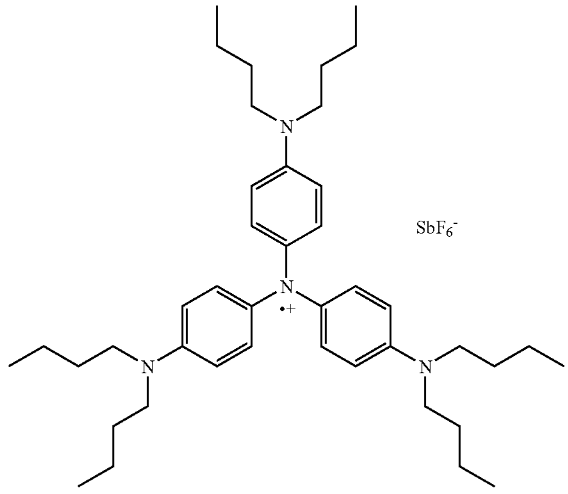

IR-99 Infrared Absorber for Reflective Layers

It can be seen in Chart 1 that IR-99 is an organic free radical compound with a single free electron shown on one of the nitrogen atoms. It is present in a salt form with a hexafluoroantimonate anion in this case. The aminium radical cation in Chart 1 has excellent absorption and reflectance properties for a reflective layer, such as, for example, in a 100 nm thick layer of 100% IR-99 on PET film, where it has no significant absorption at wavelengths of 1250 nm and higher, while having a reflectance in the range of 3 to 20% over the 1250 to 1700 nm region for a single reflective layer. Multiple reflective layers comprising the organic free radical compounds with layers that are non-reflective interposed between the reflective, organic free radical-containing layers, may be utilized to increase the amount of reflectance to 80% and higher by forming a reflective stack comprised of multiple individual layers comprising reflective free radical compounds.

FIG. 1 shows the transmission spectrum of a layer of IR-165 from 300 nm to 2100 nm. The layer of IR-165 was prepared by coating a 10% by weight solution of IR-165 in 2-butanone with a #3 wire-wound rod on a 4 mil thick clear polyethylene terephthalate (polyester) film. The spectrum was measured on a CARY 500 Scan UV-VIS-NIR spectrophotometer. CARY is a trademark for spectrophotometers from Varian, Walnut Creek, Calif. Small amounts of polymers, such as up to 30% polymer with 70% IR-165, can be added to the IR-165 layer or other IR reflective layers of this invention without significantly reducing the IR reflectance. At higher loadings of polymers, the IR reflectance decreases until it typically becomes insignificant at polymer loadings greater than 80%. Some polymers, such as polyvinyl butyral, cause the loss of IR reflectance at much lower polymer loadings than with other polymers, such as nitrocellulose and polydivinyl ethers.

It should be noted in the case of IR-99 layers that the apparent absorption of IR-99 above 1300 nm and out to at least 3000 nm is not absorption, but rather is due to the IR reflectance of the IR-99 layer. No absorption is observed above 1300 nm for IR-99 when dissolved in organic solvents or when impregnated in an aluminum oxide sol gel coating matrix. IR-99 shows no reflectance when dissolved in an organic solvent such as 2-butanone or when molecularly dispersed in a sol gel matrix such as an aluminum boehmite layer. It appears that some molecular association is needed in order for an aminium dye molecule layer to show IR reflectance.

Nine analogs of IR-99 where (1) the hexafluoroantimonate anion was changed to perchlorate, hexafluorophosphate, or an organic anion; (2) the alkyl groups on the nitrogens were changed; or (3) one of the substituted nitrogens was oxidized to form a second radical cation moiety, all showed IR reflectance similar to that of IR-99. This suggests that the unique IR reflectance is at least in part due to the radical cation moiety of these IR dyes.

Figure 2:
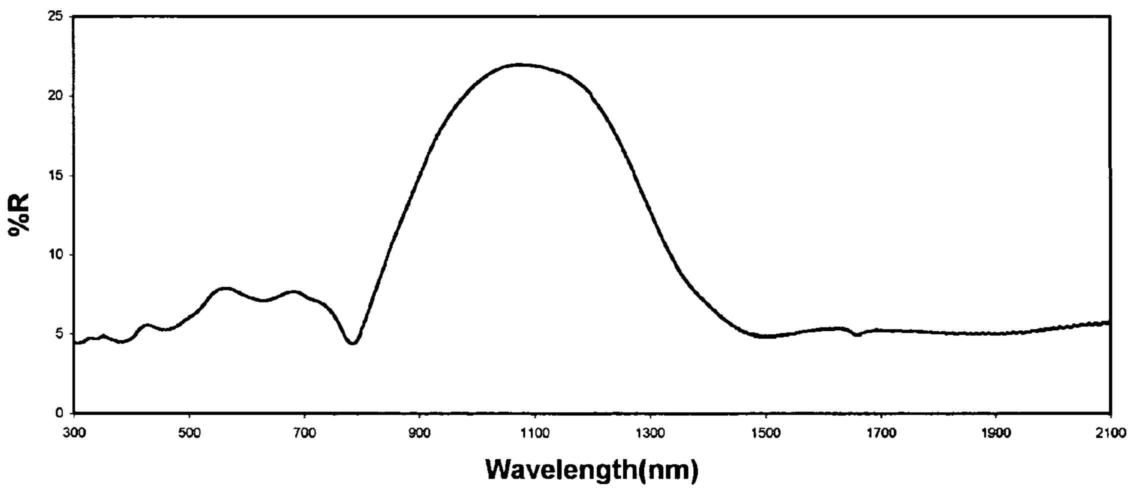
FIG. 2 shows the reflectance spectrum from 300 to 2100 nm of a layer comprising an organic free radical compound on a polyester film substrate.

FIG. 2 shows the IR reflectance of the same IR-165 layer as described for FIG. 1, across the IR region from 300 nm to 2100 nm, including in the wavelengths of 850 nm to 950 nm that are particularly important for IR-readable markings. This reflectance is specular, that is, it is mirror-like rather than diffuse. Generally, the IR reflectance of IR-165, IR-99, and other aminium radical cation layers was specular when coated on a smooth substrate, such as glass or polyester film.

Figure 3:
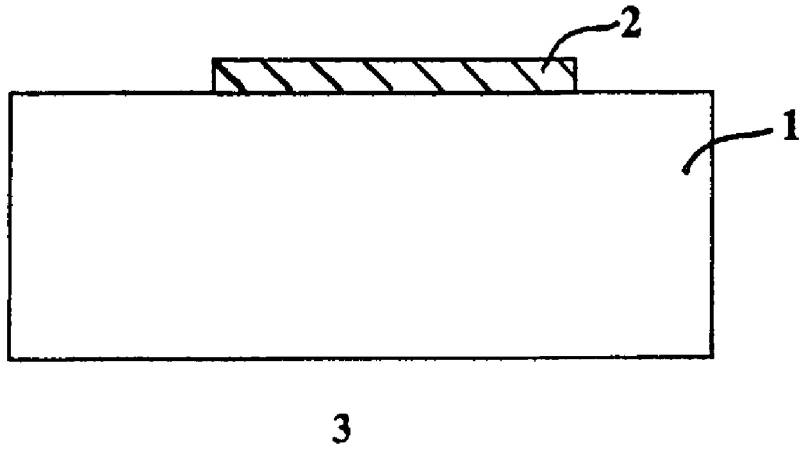
FIG. 3 shows a cross-section view of a reflective layer over a substrate.

FIG. 3 shows a cross-section view of a reflective layer 2 applied over a substrate 1. The reflective layer comprises a reflective material, preferably a reflective organic radical cation compound, such as IR-99 or IR-165. The thickness of the reflective layer may vary over a wide range. Due to the intense absorption and reflectance properties of organic free radical compounds, such as, for example, IR-99 and IR-165, absorption and reflectance can be observed at thicknesses as thin as about 0.01 micron, although it typically requires at least 0.1 micron in thickness to reach the higher levels of reflectance. In one embodiment, the thickness of the reflective layer is 0.1 to 0.3 micron. In one embodiment, the thickness of the reflective layer is 0.2 to 8 microns. In one embodiment, the thickness of the reflective layer is 0.4 to 1 micron. The substrate may be chosen from a wide variety of substrates including, but not limited to, papers, plastic films, metals, solid plastic materials, glass, and textiles. The substrates may have a wide variety of coloration including, but not limited to, being clear, white, black, colored, and printed with text and/or graphic designs.

Figure 4:
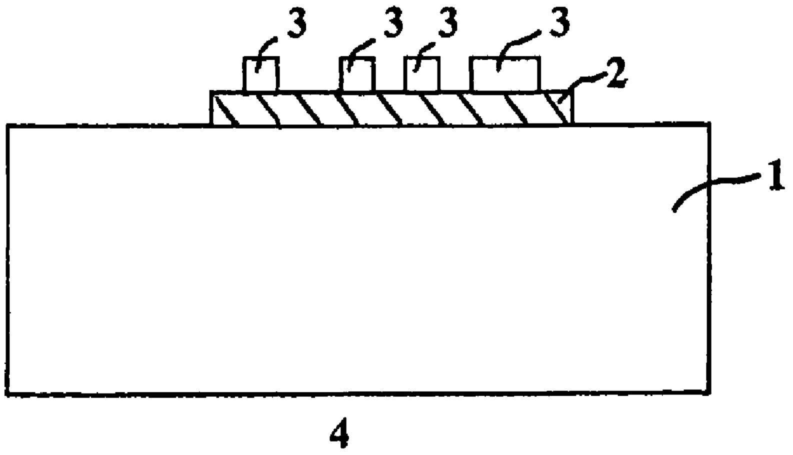
FIG. 4 shows a cross-section view of an image layer in an imagewise pattern over a reflective layer, and of the reflective layer over a substrate.

FIG. 4 shows a cross-section view of an image layer 3 in an imagewise pattern over a reflective layer 2, and of the reflective layer 2 over a substrate 1 to make a marking system 4. The reflective layer 2 and the substrate 1 are as described for FIG. 3. The image layer 3 provides a marking that is readable by a machine scanner or camera. This image layer may be applied by a variety of digital printing methods including, but not limited to, ink jet, thermal transfer, and laser methods, and by a variety of conventional printing methods, including, but not limited to, gravure, lithographic, and flexographic methods. The image layer 3 may comprise any of the markings known in the art to be readable in the visible and/or infrared regions.

For various applications such as, for example, when the marking system is utilized to prevent counterfeiting, the image layer 3 may comprise a photochromic material, preferably a reversible photochromic material comprising an organic free radical compound, such as IR-99 or IR-165. One advantage of utilizing a reversible photochromic organic free radical compound is that the image layer changes color upon activation with a light source, such as, for example, an ultraviolet (UV) hand lamp or xenon pulse lamp, and then returns to the original color. In addition to the visible color change, these photochromic markings may be machine readable in the IR, such as at 900 nm where many IR scanners operate. Their photochromic change in the IR wavelength region may be detected by the machine scanners and may be large enough to change the marking of the image layer from non-readable to become readable when activated by absorbing UV light.

Figure 5:
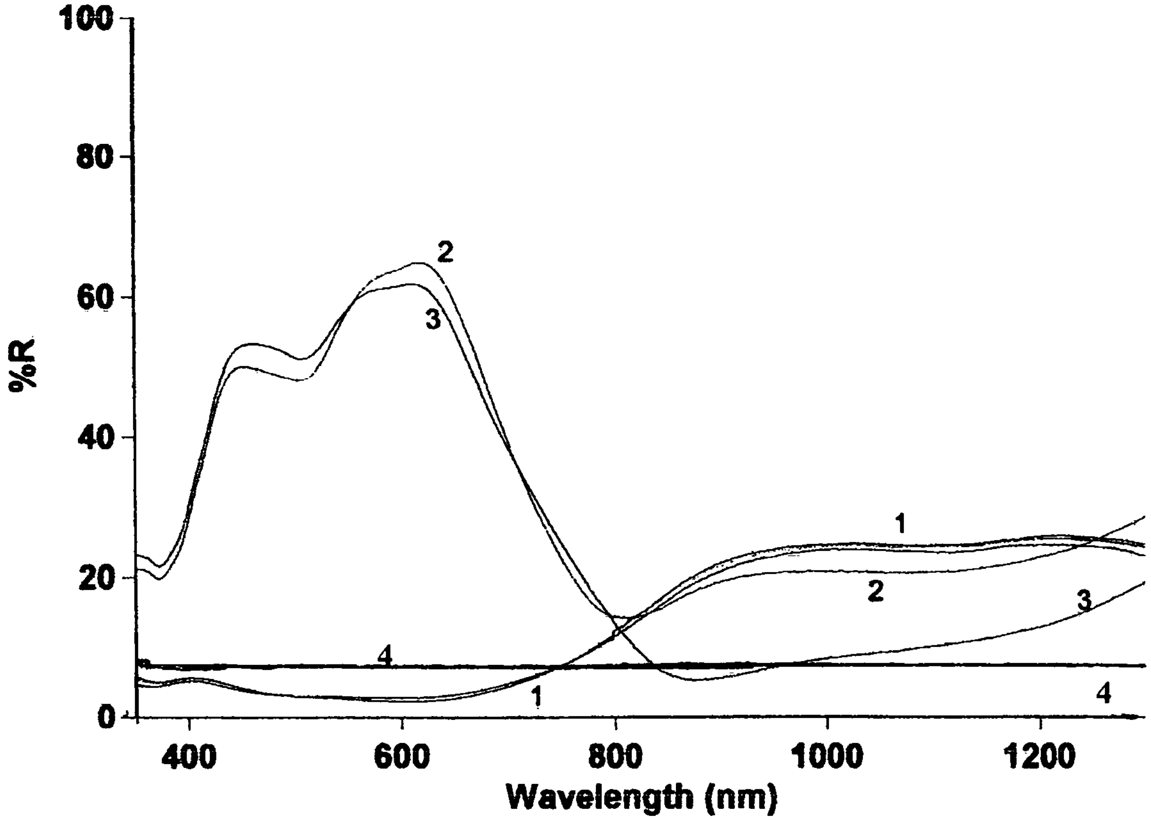
FIG. 5 shows the reflectance spectra of (curve 1) a reflective layer over a black substrate; (curve 2) a reflective layer over a white substrate; (curve 3) a non-reflective layer applied over the black substrate where the absorption of the non-reflective layer from 350 to 1300 nm is similar to the absorption of the reflective layer of curve 1; and (curve 4) the black substrate with no reflective layer coated on it.

FIG. 5 shows the reflectance spectra of (curve 1) a reflective layer over a black polyester (PET) substrate; (curve 2) a reflective layer over a white PET substrate; (curve 3) a non-reflective layer over the black substrate where the absorption of the non-reflective layer from 350 to 1300 nm is similar to the absorption of the reflective layer of curve 1; and (curve 4) the black PET substrate with no reflective layer coated on it. The relationship of the reflectance, absorption, and transmission of the reflective layer is governed by the rule that the % reflectance, % absorption, and % transmission of the layer at each wavelength adds up to 100%. The reflective layer in curve 1 was prepared by coating a 7.2 weight % solution of IR-165 in acetone with a #3 wire wound rod onto the glossy side of a black polyester film that had a black carbon-black based coating on the opposite side. Before the applying the IR reflective coating, the black polyester film had a background reflectance of about 7% across the 350 to 1300 nm region as shown in curve 4. This is a typical value for a polyester film. Curve 1 shows the increased IR reflectance above 750 nm for the reflective coating of curve 1 compared to the background curve 4. This increased IR reflectance occurs in spite of the strong absorption of IR-165 in the 800 to 1300 nm region. The absorption is intense enough to prevent nearly all the 900 nm radiation as used in many IR machine scanners from penetrating the reflective layer and reading any information below the reflective layer. Scans of several different sample positions were run for curve 1 so curve 1 consists of 3 different, but similar scan lines. This strong absorption effect is shown in curve 3 where a non-reflective layer of 2:1 nitrocellulose:IR-165 was prepared by coating a 3% solids solution of 2:1 nitrocellulose (5–6 sec., Aldrich Chemical Co., Milwaukee, Wis.):IR-165 in dimethylformamide (DMF) with a #32 wire-wound rod on a white polyester film. The absorption of this layer is shown by the less than 10% reflectance in the 800 to 1000 nm region where the white polyester film with no coating on it has a reflectance of over 90%.

Curve 2 in FIG. 5 shows the reflectance spectrum of the same coating used to coat the black polyester film in curve 1 when it is coated in the same way onto a white polyester film. This shows how the absorption and reflectance of the IR-165 coating layer mask the reflectance of the substrate so that the resulting reflectance spectra in curves 1 and 2 are very similar even though curve 1 had a black substrate with a % reflectance of about 7% and curve 2 had a white polyester substrate with a % reflectance of over 90%.

Thus it can be seen that reflective layers with a strong absorption in the areas where they reflect are useful as uniform reflective backgrounds to mask underlying layers from machine scanners while providing a uniform reflective background layer on which to place or stack new machine readable codes such as, for example, bar codes. For example, a visible bar code with a carbon black-based image that can be read in either the visible or the infrared could be printed on a substrate, such as a white plastic ID card. A reflective IR coating such as applied to make the layers measured in curves 1 and 2 in FIG. 5 could be applied for example by thermal transfer or another printing technique in an imagewise pattern, including a large solid patch. Various IR-readable images, such as, for example, a carbon black-based image or a non-black reversible, visibly transparent photochromic marking in the pattern of a bar code could then be printed on this reflective IR coating by thermal transfer or another printing technique. The reversible photochromic marking could be non-readable in the infrared at 900 nm unless activated by exposure to UV light. The underlying carbon black-based image remains readable in the visible, such as at 650 nm, but is not machine readable in the infrared, such as at 900 nm, because the 900 nm IR radiation does not sufficiently penetrate through the reflective layer. In the case of an overlying carbon black-based image layer, such as a bar code, overlying the reflective layer, it is readable in the infrared and has no interference from any markings or images below the reflective layer. In the case of the photochromic marking, one variety includes becoming readable in the infrared when activated by UV light and returning to non-readable within minutes to hours after the UV exposure depending on the composition of the photochromic marking.

This approach provides stacked markings where the underlying marking is readable by a visible machine scanner or a human and the overlying marking is only readable by an infrared or IR machine scanner. This is advantageous in providing unique security features and also in allowing a greater density of information to be contained in a small area. The stacking using the reflective layers of this invention could also involve placing IR readable codes over graphics, holograms, smart cards, and other types of markings and devices in various substrates.

The spectra in FIG. 5 illustrate the principles behind one general example of masking or stacking machine readable codes that is mostly directed for use with machine scanners in the 800 to 1100 nm region. This same principle can be used to have reflective layers with a strong reflectance in the visible, such as in the 580 to 700 nm region, together with a strong absorption in these areas so that visible machine scanners cannot read beneath this reflective layer and the reflective layer acts as a uniform reflective background that provides contrast to visible machine readable codes placed imagewise over the reflective layer. The absorption of the reflective layer in the 400 to 550 nm wavelength region of the visible can be kept low to provide visual transparency to the eye. Thus, in one aspect of the marking systems of this invention, the reflective layer is opaque to optically reading the substrate at one or more visible wavelengths. In one embodiment, the reflective layer is reflective at the one or more visible wavelengths. In one embodiment, the reflective layer has greater than 10% reflectance, preferably greater than 20% reflectance, and most preferably greater than 30% reflectance, at the one or more visible wavelengths. In one embodiment, the one or more visible wavelengths are in the visible region of 580 to 700 nm.

Figure 6:
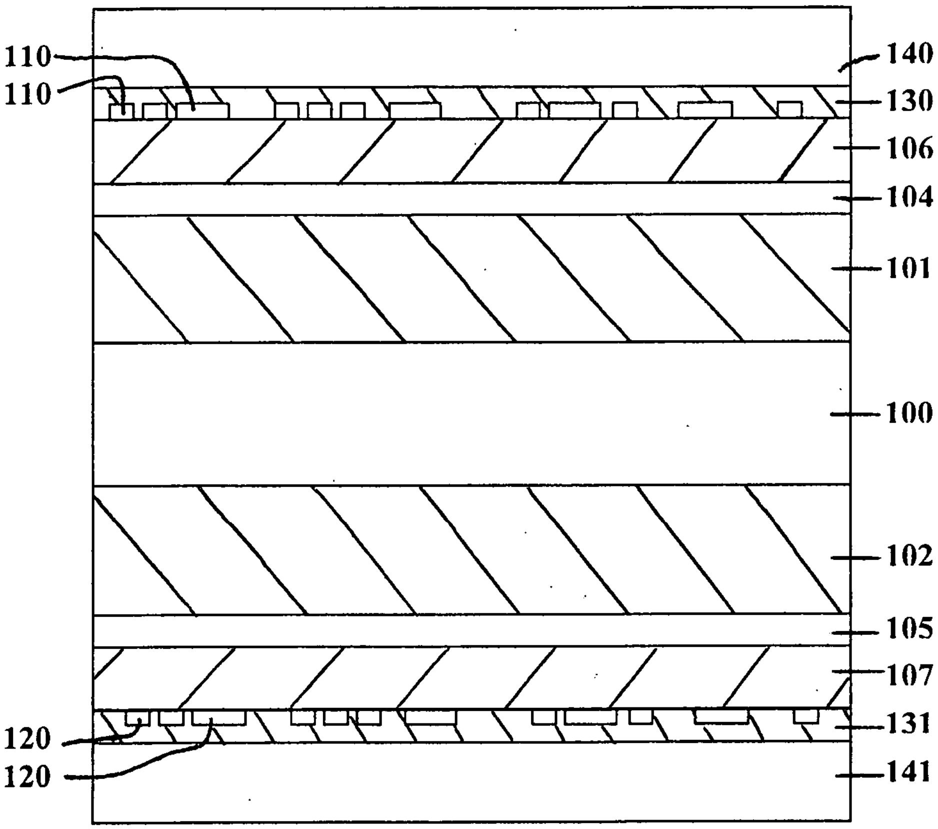
FIG. 6 shows a cross-section view of a card stock with a reflective layer on both sides of the card stock and a bar code marking overlying each reflective layer.

FIG. 6 illustrates another embodiment of the reflective organic layers for marking systems of the present invention. In a cross-section view, layers 100, 101, 102, 103, 106, and 107 are laminated plastic films of the type used in making card stocks for markings systems, such as for example ID cards. These include, for example, clear plastic films used in Type II card stock applications as described by Dupont Teijin Films, Hopewell, VA, in their product literature for applications of MELIINEX 342 polyester film, a two-side heat sealable polyester film. MELIINEX is a trademark for polyester films available from Dupont Teijin Films. Layer 100 is a clear plastic, such as polyvinyl chloride (PVC), core film. Layers 101 and 102 are a clear heat-sealable plastic film, such as for example MELIINEX 342 polyester film, that has been laminated to layer 100. Layers 104 and 105 are IR reflective and absorbing layers, such as the layer of IR-165 as described in regards to FIGS. 1, 2, and 5, that are coated on one side of layers 101 and 102. Layers 106 and 107 are clear plastic, such as PVC, film overlays that have been laminated to the core of layers 100, 101, 102, 103, 104, and 105 to make a card stock for imaging in an ID, security, or other marking system. Preferably, the card stock before imaging is clear or transparent in the visible wavelength region so the full benefits of the reflective markings for security applications can be obtained. During imaging of the card stock, a portion or all of the card stock can be printed to provide a visually opaque or colored image, if desired. As long as the IR or other scanning wavelengths corresponding to the reflective wavelengths of layers 104 and 105 are not masked or blocked, reflective layers 104 and 105 will still function as uniform reflective backgrounds for scanning or optical reading purposes.

Layers 110 and 120 are IR-readable bar code patterns that are printed on opposite sides of the card stock. As illustrated in FIG. 6, these bar code patterns are comprised of areas of different sizes, widths, and spacing, as is known in the art of optically readable information. Any IR-readable marking materials, such as those, for example, comprising carbon black pigments or non-black IR-absorbing dyes, may be utilized individually or in combination. Layers 130 and 131 are an adhesive layer of overlaminate films 140 and 141, respectively, that are applied over the imaged card stock for protection and durability of the marking system. Because of the IR reflectance and absorption properties of layers 104 and 105, an IR scanner, such as a 3800 IR-12 scanner from Handheld Products, Skaneateles Falls, N.Y., can read bar code marking 110 when scanned from the side of the card stock on which marking 110 is printed. Similarly, it can read bar code marking 120 when scanned from the side of the card stock on which marking 120 is printed. The IR reflective and absorptive layers 104 and 105 provide a uniform reflective background for reading the bar code markings with the IR scanner while blocking or masking any scanning or reading of bar code and other markings on the opposite side of the card stock or under the IR reflective and absorptive layers 104 and 105.

Because layers 104 and 105 are visually transparent and relatively non-reflective in the visible region, scanning of IR-readable bar code markings, such as carbon black-based markings, that are also readable by visible scanners that typically operate in the 630 to 680 nm wavelength region in the imaged card stock configuration of FIG. 6, using a visible scanner, such as a 3800 LR-12 scanner from Handheld Products, Skaneateles Falls, N.Y., typically does not result in reading either of the bar code markings no matter which side of the card stock is scanned. This occurs because bar code markings 110 and 120 overlap each other when scanned and also layers 104 and 105 may not provide a suitable uniform reflective background in the visible region for readability with a visible scanner.

Thus, one aspect of the reflective layers of the present invention pertains to a card stock for a marking system comprising one or more reflective layers that are applied on a substrate, wherein at least one of the one or more reflective layers comprises a reflective organic free radical compound; and wherein an image layer is applied in an imagewise pattern overlying at least one of the one or more reflective layers, wherein the image layer comprises optically readable information. It can been seen from FIG. 6 and the discussion of the function of the reflective layers that a single organic reflective layer of this invention could be used and could be located between a wide number of other layers in the card stock or on a top surface of the card stock or could be applied during the imaging of the card stock. Similarly, two or more organic reflective layers of this invention could be applied at a wide variety of locations in the card stock and in the imaged card stock.

Another aspect of the reflective layers of this invention pertains to a card stock for a marking system, which card stock comprises one or more reflective layers over at least a portion of a substrate of the card stock, wherein at least one of the one or more reflective layers comprises a reflective organic free radical compound. In one embodiment, the at least a portion of the substrate is visibly transparent. In one embodiment, at least one of said one or more reflective layers is opaque to optically reading the substrate at one or more infrared wavelengths. In one embodiment, an image layer applied in an imagewise pattern overlying the at least one of the one or more reflective layers, the image layer comprising optically readable information, is optically readable at the one or more infrared wavelengths when scanned from the side of the card stock on which the image layer was applied and is not optically readable at the one or more infrared wavelengths when scanned from the side of the card stock opposite from which the imaging layer was applied.

One particularly unique aspect of the reflective layers comprising a reflective organic free radical compound of this invention is the absence of absorption at some wavelengths where the reflectance occurs. This unique property of reflecting optical signals while having no absorption of the optical signals is particularly useful for avoiding degradation by absorption of photons by an optical device, for minimizing the insertion loss of an optical signal being switched or transmitted, and for maximizing the contrast ratio of an output signal between the "switched" and "non-switched" states. Besides the solid state, "no moving parts" aspect of optical shutters, optical switch devices, and optical buffers comprising these reflective layers in contrast to the moving nature of other reflective optical switches such as, for example, those based on microelectromechanical system (MEMS) devices, these optical devices and layers comprising reflective organic free radical compounds are unique and useful in involving actually reflective materials to reflect in a passive function and to also be able to be made to switch in a dynamic reflective mode, in contrast to the use of multiple layers of materials of differing indices of refraction to provide reflection or mirror-like properties in a passive form or dynamically if a mechanical motion of the layers is induced.

Organic free radical compounds, especially the aminium radical cation compounds such as IR-99 and IR-165, have excellent photo-stability so they are stable enough for security markings, solar window films, and other product applications where they will be exposed to high levels of sunlight and room light. For example, a reflective layer of IR-165 on a clear polyester film with a thin overcoating of polystyrenesulfonic acid sodium salt polymer showed no significant change in reflectance and absorption in the visible and IR regions after accelerated exposure to a high intensity xenon lamp that represented about 3 years of exposure to the sun in a solar window film type application.

Thus, the reflective layers, optical shutters, and other optical elements of this invention comprising a reflective organic free radical compound provide unique classes of passive and dynamic reflective marking systems, optical switches, solar window films, and other optical devices. The passive reflective marking systems of this invention may optionally utilize a reflective organic compound that is not a free radical compound to provide the uniform reflective and masking layer.

Methods of Making Marking Systems

Another aspect of this invention pertains to a method of marking an article, wherein the method comprises the steps of (i) providing a substrate; and (ii) applying a reflective layer over the substrate, wherein the reflective layer comprises a reflective organic free radical compound. One example of the resulting article is illustrated in FIG. 3. In one embodiment, the reflective layer is visibly transparent. In one embodiment, the reflective layer is opaque to optically reading the substrate at one or more visible and/or infrared wavelengths. In one embodiment, the method comprises a step (iii) of applying an image layer in an imagewise pattern over the reflective layer, wherein the image layer comprises optically readable information. Two examples of the resulting article with an image layer are illustrated in FIGS. 4 and 6. In one embodiment, the imagewise pattern of the image layer comprises a bar code. In one embodiment, the image layer comprises a photochromic material.

While the invention has been described in detail and with reference to specific and general embodiments thereof, it will be apparent to one skilled in the art that various changes and modifications can be made therein without departing from the spirit and scope thereof.

The invention claimed is:

1. An optical device comprising an infrared reflective layer, wherein said reflective layer comprises an organic radical cation compound that provides reflectance in the infrared region from 1250 nm to 1700 nm, wherein said organic radical cation compound is a salt of a tetrakis (phenyl)-1 ,4-benzenediamine radical cation.

2. The optical device of claim 1, wherein the thickness of said infrared reflective layer is 0.1 to 0.3 microns.

3. The optical device of claim 1, wherein the thickness of said infrared reflective layer is 0.2 to 8 microns.

4. The optical device of claim 1, wherein the thickness of said infrared reflective layer is 0.4 to 1 micron.

5. The optical device of claim 1, wherein said reflective layer comprises from about 70 percent to 100 percent of said organic radical cation compound and from 0 percent to about 30% of an organic polymer.

6. An optical device comprising an infrared reflective layer, wherein said reflective layer comprises an organic radical cation compound that provides reflectance in the infrared region from 1250 nm to 1700 nm, wherein said organic radical cation compound is a salt of a tris(phenyl)-aminium radical cation.

7. A marking system comprising an infrared reflective layer that is applied over a substrate, wherein said reflective layer comprises an organic free radical compound that provides reflectance in the infrared region from 1250 nm to 1700 nm, wherein said organic free radical compound is a salt of a tetrakis(phenyl)-1,4-benzenediamine radical cation.

8. The marking system of claim 7, wherein said reflective layer is visibly transparent.

9. The marking system of claim 7, wherein said reflective layer is opaque to optically reading said substrate at one or more infrared wavelengths.

10. The marking system of claim 9, wherein said reflective layer is reflective at said one or more infrared wavelengths.

11. The marking system of claim 9, wherein said reflective layer has greater than 10% reflectance at said one or more infrared wavelengths.

12. The marking system of claim 9, wherein said reflective layer has greater than 20% reflectance at said one or more infrared wavelengths.

13. The marking system of claim 9, wherein said reflective layer has greater than 30% reflectance at said one or more infrared wavelengths.

14. The marking system of claim 7, wherein said reflective layer is opaque to optically reading said substrate at one or more visible wavelengths.

15. The marking system of claim 14, wherein said reflective layer is reflective at said one or more visible wavelengths.

16. The marking system of claim 15, wherein said reflective layer has greater than 10% reflectance at said one or more visible wavelengths.

17. The marking system of claim 15, wherein said reflective layer has greater than 20% reflectance at said one or more visible wavelengths.

18. The marking system of claim 15, wherein said reflective layer has greater than 30% reflectance at said one or more visible wavelengths.

19. The marking system of claim 14, wherein said one or more visible wavelengths are in the visible region of 580 to 700 nm.

20. A marking system comprising an infrared reflective layer that is applied over a substrate, wherein said reflective layer comprises an organic free radical compound that provides reflectance in the infrared region from 1250 nm to 1700 nm, wherein said organic free radical compound is a salt of a tris(phenyl)-aminium radical cation.

21. A marking system comprising a reflective layer that is applied over a substrate, wherein said reflective layer comprises a reflective organic free radical compound; and wherein an image layer is applied in an imagewise pattern overlying said reflective layer, wherein said image layer comprises optically readable information.

22. The marking system of claim 21, wherein said reflective layer is visibly transparent.

23. The marking system of claim 21, wherein said reflective layer is opaque to optically reading said substrate at one or more infrared wavelengths.

24. The marking system of claim 23, wherein said reflective layer in areas where there is no overlying imagewise pattern of said image layer is reflective at said one or more infrared wavelengths, and wherein said imagewise pattern of said image layer is optically readable at said one or more infrared wavelengths.

25. The marking system of claim 21, wherein said reflective layer is opaque to optically reading said substrate at one or more visible wavelengths.

26. The marking system of claim 25, wherein said reflective layer in areas where there is no overlying imagewise pattern of said image layer is reflective at said one or more visible wavelengths, and wherein said imagewise pattern of said image layer is optically readable at said one or more visible wavelengths.

27. The marking system of claim 21, wherein said image layer comprises a photochromic material.

28. The marking system of claim 27, wherein said imagewise pattern of said image layer is in a state of high transparency at one or more visible and/or infrared wavelengths in a non-activated state, and reversibly shifts to a state of low transparency at said one or more visible and/or infrared wavelengths in an activated state by the photon-induced reaction of said photochromic material.

29. The marking system of claim 28, wherein said non-activated state is not optically readable at said one or more visible and/or infrared wavelengths, and wherein said activated state is optically readable at said one or more visible and/or infrared wavelengths.

30. The marking system of claim 28, wherein said photochromic material comprises an organic free radical compound in one or both of said non-activated and activated states.

31. The marking system of claim 28, wherein said photochromic material comprises a salt of an organic radical cation in one or both of said non-activated and activated states.

32. The marking system of claim 21, wherein said imagewise pattern comprises a bar code.

33. A card stock for a marking system, which card stock comprises a substrate and one or more reflective layers over at least a portion of said substrate, wherein at least one of said one or more reflective layers comprises a reflective organic free radical compound; wherein an image layer applied in an imagewise pattern overlying said at least one of said one or more reflective layers, said image layer comprising optically readable information, is optically readable at said one or more infrared wavelengths when scanned from the side of said card stock on which said image layer was applied and is not optically readable at said one or more infrared wavelengths when scanned from the side of said card stock opposite from which said image layer was applied.

34. The card stock of claim 33, wherein said at least a portion of said substrate is visibly transparent.

35. The card stock of claim 33, wherein at least one of said one or more reflective layers is opaque to optically reading said substrate at one or more infrared wavelengths.

36. A method of marking an article, which method comprises the steps of:

(i) providing a substrate; and (ii) applying a reflective layer over said substrate, wherein said reflective layer comprises a reflective organic free radical compound; and (iii) applying an image layer in an imagewise pattern over said reflective layer, wherein said image layer comprises optically readable information.

37. The method of claim 36, wherein said reflective layer is visibly transparent.

38. The method of claim 36, wherein said reflective layer is opaque to optically reading said substrate at one or more infrared wavelengths.

39. The method of claim 36, wherein said reflective layer is opaque to optically reading said substrate at one or more visible wavelengths.

40. The method of claim 36, wherein said image layer comprises a photochromic material.

41. The method of claim 36, wherein said imagewise pattern comprises a bar code.

42. A solar window film comprising an infrared reflective layer, wherein said reflective layer comprises an organic radical cation compound that provides reflectance in the infrared region from 1250 nm to 1700 nm, wherein said organic radical cation compound is a salt of a tetrakis(phenyl)-1,4-benzenediamine radical cation.

43. The solar window film of claim 42, wherein the thickness of said infrared reflective layer is 0.1 to 0.3 microns.

44. The solar window film of claim 42, wherein the thickness of said infrared reflective layer is 0.2 to 8 microns.

45. The solar window film of claim 42, wherein the thickness of said infrared reflective layer is 0.4 to 1 micron.

46. The solar window film of claim 42, wherein said reflective layer comprises from about 70 percent to 100 percent of said organic radical cation compound and from 0 percent to about 30% of an organic polymer.

47. A solar window film comprising an infrared reflective layer, wherein said reflective layer comprises an organic radical cation compound that provides reflectance in the infrared region from 1250 to 1700 nm, wherein said organic radical cation compound is a salt of a tris(phenyl)-aminium radical cation.

48. A mirror, comprising an infrared reflective layer, wherein said reflective layer comprises an organic radical cation compound that provides reflectance in the infrared region from 1250 nm to 1700 nm, wherein said organic radical cation compound is selected from the group consisting of a salt of a tetrakis(phenyl)-1,4-benzenediamine radical cation and a salt of a tris(phenyl)-aminium radical cation.

49. A security marking comprising an infrared reflective layer, wherein said reflective layer comprises an organic radical cation compound that provides reflectance in the infrared region from 1250 nm to 1700 nm wherein said organic radical cation compound is selected from the group consisting of a salt of a tetrakis(phenyl)-1,4-benzenediamine radical cation and a salt of a tris(phenyl)-aminium radical cation.

* * * * *